United States Patent [19]
Kunze et al.

[11] Patent Number: 5,187,973
[45] Date of Patent: Feb. 23, 1993

[54] LEAK MONITOR FOR HYDRAULIC DRIVE SYSTEMS

[75] Inventors: Hans-Jurgen Kunze, Bottrop-Kirchhellen; Josip Francuz, Moers, both of Fed. Rep. of Germany

[73] Assignee: Silvia Kunze, Bottrop-Kirchhellen, Fed. Rep. of Germany

[21] Appl. No.: 640,398

[22] PCT Filed: May 18, 1990

[86] PCT No.: PCT/EP90/00809
§ 371 Date: Mar. 18, 1991
§ 102(e) Date: Mar. 18, 1991

[87] PCT Pub. No.: WO90/14584
PCT Pub. Date: Nov. 29, 1990

[30] Foreign Application Priority Data

May 19, 1989 [DE] Fed. Rep. of Germany ....... 3916382
Jul. 18, 1989 [DE] Fed. Rep. of Germany ... 8908692[U]

[51] Int. Cl.$^5$ ............................................. G01M 3/28
[52] U.S. Cl. ................................................ 73/40.5 R
[58] Field of Search ...................... 73/40.5 R, 40, 49.5

[56] References Cited

U.S. PATENT DOCUMENTS 4,152,925  5/1979  Lindh .............................. 73/40.5 R
4,608,857  9/1986  Mertens et al. .................. 73/40.5 R

*Primary Examiner*—Hezron E. Williams
*Assistant Examiner*—Joseph W. Roskos
*Attorney, Agent, or Firm*—Blakely, Sokoloff, Taylor & Zafman

[57] ABSTRACT

The drive systems include at least one conduit leading to a machine unit which may be selectively connected to a pump or a tank. Arranged in the conduit is a holding valve which, when the conduit is connected to the tank, maintains a minimum pressure in the conduit branch leading to the machine unit. A pressure sensor arranged in this conduit branch determines the actual value of the conduit pressure. If this decreases with respect to the minimum pressure predetermined by the opening pressure of the holding valve, which is determined by a comparison device, this is an indication that the conduit section has a leak, if only a small one.

20 Claims, 2 Drawing Sheets

LEAK MONITOR FOR HYDRAULIC DRIVE SYSTEMS

The invention relates to a method of operating a hydraulic machine unit which is selectively connected to a tank or a pump via at least one conduit. The invention further relates to a hydraulic drive system, particularly for working machines used in underground mine operations, with a tank, a pump connected thereto and conduits leading to a machine unit for the supply and return of the hydraulic fluid, the conduits starting from a control device.

With hydraulic drive systems for working machines used in underground mine operations there is the problem that on the one hand damage to the associated hoses occurs relatively frequently because the hoses are subjected to external forces under the conditions which prevail underground and that on the other hand the damage to the hoses may only be detected and located with difficulty because the hoses are not visible or accessible or only with difficulty either in the vicinity of the working machine itself or as a consequence of the prevailing operational conditions.

If, for instance, the above problem is considered in the case of a so-called boom-type road header as a road header, the result is, in particular, a loading, which is absolutely typical for the conditions underground, of the machine units by the heap of debris which has been cut free and which reaches the partially exposed hoses and causes an external mechanical stressing of the hoses. Additionally, the hoses which are guided partially covered in or on the machine body are also involved since the boom-type road header also moves and operates in the heap of debris so that portions of the debris also reach the hoses guided in the vicinity of the machine.

Whilst hose breakages which occur may be relatively easily detected as a result of the hydraulic fluid which visibly escapes at high operational pressure in the drive system and above all may be located in accordance with its escape, there is a considerable problem in the detection of smaller leaks which can be scarcely detected and located as such even during operation of the machine. Thus such small leaks occur unnoticed even during idling of the drive unit or the machine during which an idling pressure in the hydraulic system of the order of, for instance, 3 bar can be assumed, also during working sequences at the machine as regards all units not involved therewith and thus not subjected to the operational pressure because a functional failure of the units in question does not occur. Such small leaks are thus frequently only presumed or detected as a result of establishing an above average "consumption" of hydraulic fluid and can only be cured during a stoppage of the machine.

The problem of leakage losses is however not limited to the working machines discussed above and used in underground mine operations but applies basically to all units driven with hydraulic fluid. In each case, leakage losses impair not only the efficiency of operation but also constitute an environmental load which should not be underestimated since the hydraulic fluids are to be regarded as aggressive pollutants.

It is thus the object of the invention to provide a hydraulic leak monitor with which even small leaks in the conduit system of the relevant working machine may be detected.

The solution of this object together with advantageous embodiments and features will be apparent from the content of the claims which precede this description.

The invention is based on the recognition that the stoppage times of the machine units in which they are switched off or are temporarily not acted on by the working pressure can be used to ensure the tightness of the conduits. For this purpose, a minimum pressure is set in the conduits which is at least at the level of the biassing pressure predetermined by the hydraulic system. This means that the conduit cannot discharge to the tank any further than to the predetermined minimum pressure. If, however, the pressure within the conduit sinks below the minimum pressure, this is an indication that a leak has occurred. Even slight leakages may thus be detected and located early. A serious conduit breakage with corresponding loss of hydraulic fluid and with corresponding evironmental loading can thus be prevented.

The invention starts from the basic concept that disposed in each connecting conduit to a machine unit there is a holding valve with an opening pressure set to correspond to at least the biasing pressure prevailing in the conduits during idling of the machine and a pressure sensor between each holding valve and the machine unit, whereby the measured value is transmitted to a device for comparing the actual value with the opening pressure which is predetermined as a desired pressure value.

The invention is principally associated with the advantage that even relatively small leaks can be determined with the measurable pressure drop in the region of the hoses, even during idling of the machine outside the functional controls of the machine unit in question. The possibility is thus advantageously obtained of replacing even only slightly damaged hoses or conduits in the course of preventative maintenance and thus avoiding a complete hose breakage and the stoppage of the machine necessarily associated therewith. A further advantage is that even during the course of working processes of the machine individual hoses or conduits which are not subjected to the operational pressure can be replaced since all the hoses not connected to units involved in the working process of the machine are cut off from the biasing pressure by the holding valves so that they can thus be replaced even during further operation of the machine. This advantage is also of great significance in the context of preventative maintenance.

In order to detect and locate small leaks it is sufficient to expose the check valves to a pressure which corresponds to the biasing pressure prevailing in the conduits during idling of the machine so that only when the machine unit connected to the hydraulic hoses in question is switched on are the hoses subjected to the operational pressure which is then to be applied, whereby when the operational pressure is applied the holding valve opens the path for the hydraulic liquid.

If the machine unit is not subjected to operational pressure, the biasing pressure, which is determined by the sensors disposed in the hose system, prevails in the associated hose system. An actual value is thus available which must correspond to the set desired value in the amount of the biasing pressure when no leak is present. If the comparison of the predetermined desired value in the amount of the biasing pressure with the actual value determined by the sensor for the pressure prevailing in the hose system produces a deviation in the sense of a pressure loss in the hose system, this pressure loss can only be caused by hydraulic fluid discharging via a leak. This deviation of the desired/actual values can then be converted by the device into an acoustic and/or optical signal for fault detection.

In exemplary embodiments of the invention it is provided that a plurality of holding valves with associated sensors are disposed to form conduit sections in order to facilitate the location of leaks; the same applies to machine units connected in a compound arrangement by means of branch conduits in which a holding valve with a sensor should then be arranged downstream of each junction.

The invention uses valve devices which can be used on a multiplicity of any desired hydraulic machine units but particularly on double-acting working piston machines, each of which requires two conduits. The preferred field of application is, as mentioned, such devices in which the conduits or hoses are concealed and/or subjected to external influences, such as in excavation work in road building and particularly in mines.

The valve devices can provide a separate valve unit for each conduit. They are, however, then heavy, cost intensive and space consuming. In accordance with the invention, a valve device is provided which is lighter and smaller and which may be manufactured more economically.

To this end, the valve device in accordance with the invention is characterised in that it constitutes a plate-shaped block in which the branches of each conduit extend at an angle to one another towards the associated check valve whereby the branches leading to the control device pass into mutually opposing narrow sides of the block and the branches leading to the hydraulic machine unit pass into a common third narrow side of the block and whereby further the branches of the first conduit are offset with respect to one another relative to those of the second conduit both in the direction of the mutually opposing narrow sides and also transversely to the plate-shaped block.

Such an arrangement of the individual conduit branches and components in and on the plate-shaped block ensures a minimum constructional size. The block may also be machined and prepared in a small number of working steps so that the manufacturing costs can also be minimised.

These advantages can be reinforced if the branches of each conduit extend at right-angles to one another, whereby the same branches of the two conduits preferably extend parallel to one another.

The holding valves can be installed in openings which extend transverse to the plate-shaped blocks. On the other hand, it is more advantageous if the holding valves are inserted into bores in a fourth narrow side opposed to the third narrow side. These bores represent only a slightly increased amount of work, particularly if they constitute continuations of the branches leading to the machine unit.

The arrangement of the pressure sensors may be of any type. Preferably, however, the pressure sensors are arranged at one of those narrow sides into which at least one of the branches leading to the control device passes. They can then be disposed in a favourable manner adjacent to one another on the block.

Such combinations of the features mentioned above which differ from the above combinations are also disclosed as being of importance to the invention.

The invention will be described in more detail in the following preferred exemplary embodiments in conjunction with the accompanying drawings, in which.

Figure 1:
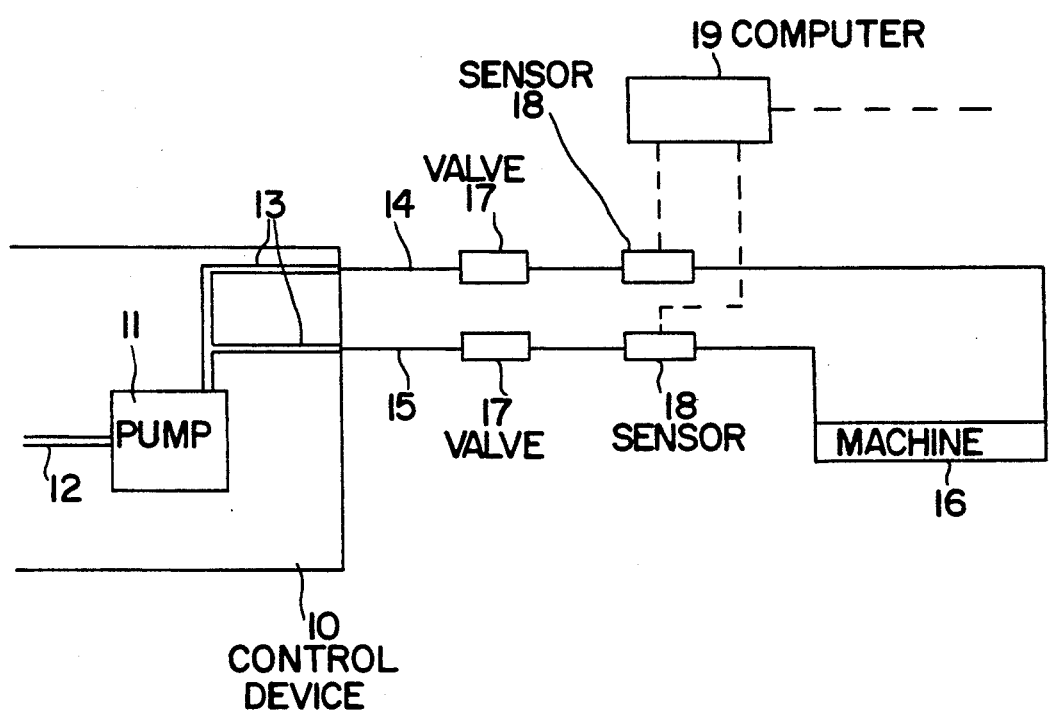
FIG. 1 is a schematic representation of a hydraulic drive system and its associated components.

Rigidly cased conduits 13 extend on a control device 10 with a pump 11 and a tank connection 12 to connections from which conduits 14,15, constructed as hoses, extend to a machine unit 16 which is shown as an example; in the case of a boom-type road header as the working machine the machine unit 16 can, for instance, be the loading apron side plate cylinder on the loading apron of the boom-type road header.

Connected into the conduit 14 and also in the conduit 15 is a respective holding valve 17, preferably directly downstream of the connection to the conduits 13 of the control device 10, associated with which is a sensor 18 for determining the respective pressure prevailing in the conduit 14,15, which for its part transmits the determined actual values for the pressure prevailing in the conduits to a computing device 19 in which a comparison of the actual value with a predetermined desired value is effected. Due to the alternating action on the conduits 14,15 depending on the operational state of the machine unit 16, the holding valve 17 must be constructed to be double-acting, that is to say to act in both directions.

In accordance with the invention, the desired value predetermined in the device 19 can correspond to the biasing pressure produced by the pump 11 during idling operation which, for instance in the case of a boom-type road header of usual construction, is about 3 bar. The opening pressure of each check valve 17 is also set to this pressure and opens the associated conduits 14,15 when the biasing pressure is exceeded on commencement of the working operation of the machine unit 16.

In the non-functional setting of the machine unit 16 the biasing pressure of 3 bar must also be present in the conduits 14,15 between the unit 16 and the control device 10 when the holding valve 17 is closed. Accordingly, if in the off position of the machine unit 16 an actual value is determined by the sensor 18 which is the same as the desired value predetermined in the computing device 19 then there is no leak; if an actual value is transmitted by the sensor 18 to the device 19 which is less than the desired value then the pressure loss which is thus determined in the conduits 14,15 can only be caused by a leak in the conduits and by hydraulic fluid which is thus leaking so that even if the deviation of the desired/actual values is small the detection of a leak is rendered possible at an early stage.

A deviation of the desired/actual values thus determined in the device 19 is indicated as an optical and/or acoustic signal, whereby it can be provided in accordance with the invention that corresponding signals are transmitted to the surface control station as a central monitoring point for the machines used in the underground area.

As is not shown in detail in the diagrammatic illustration for the sake of simplicity, it is provided in accordance with the invention that holding valves with associated sensors are connected in all the conduits leading from the control device 10 and connected to machine units; it also falls within the scope of the invention to produce monitorable sections in long hoses by arranging check valves with associated sensors one behind the other; a similar monitoring is produced also for conduit branches in which holding valves and associated sensors are to be provided behind the corresponding junctions.

Figure 2:
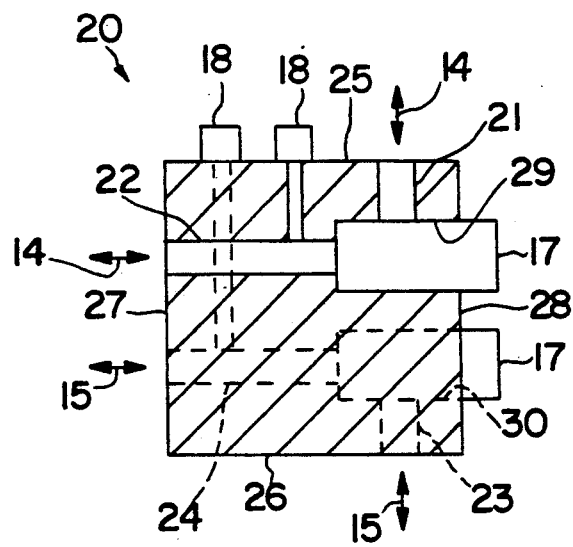
FIG. 2 is a front view of a valve device in accordance with the invention.
Figure 3:
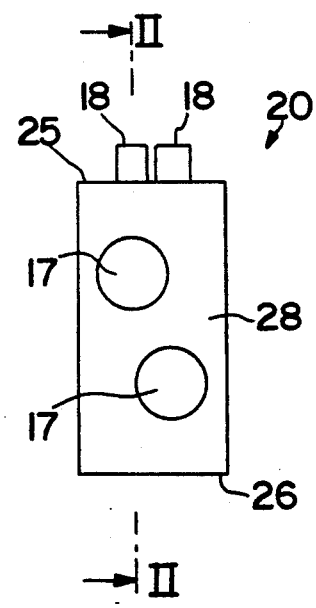
FIG. 3 is an associated side view, seen from the right in FIG. 2.

The valve device shown in FIGS. 2 and 3 constitutes a plate-shaped block 20 for the conduits 14 and 15 which extend in the form of hoses between the control device and the hydraulic machine unit, in the present case a double-acting hydraulic working piston machine. The conduit 14 constitutes within the block 20 a branch 21 leading to the control device and a branch 22 leading to the hydraulic machine unit. Similarly, the conduit 15 constitutes a branch 23 leading to the control device and a branch 24 leading to the hydraulic machine unit. The branches 21 and 22 of the conduit 14 and the branches 23 and 24 of the conduit 15 are in communication with one another via a respective one of the check valves 17. The branches 21 and 23 open out in mutually opposing narrow sides 25 and 26 of the block 20. The branches 22 and 24 on the other hand open out in a common third narrow side 27. Constructed in a fourth narrow side 28 opposed to it are bores 29 and 30 which receive the check valve 17. The bores 29 and 30 form continuations of the branches 22 and 24, respectively. The latter are constructed at right-angles to the associated branches 21 and 23, respectively. Connected to the branches 22 and 24 are the sensors 18. The branches 21 and 23 on the one hand and 22 and 24 on the other hand extend parallel to one another.

The arrangements—with the exception of the sensors 18—are constructed overall mirror symmetrically to one another and offset from one another on the one hand in the direction of the narrow sides 25 and 26 and on the other hand transversely to the plate-shaped block 20. The latter is apparent most clearly in FIG. 2.

In this manner a simply manufactured, compact and correspondingly light-weight and space-saving arrangement is achieved which fullfils the necessary functions. If one of the branches 22 and 24 leading to the machine unit is not under operational pressure, the associated holding valve 17 sets the predetermined pressure in this branch. As soon as the associated sensor 18 notes a reduction in the set pressure, this is an indication that the monitored hose has a leak. Each holding valve corresponds in its function to a pair of oppositely acting back-pressure valves which are set to a predetermined pressure.

Modifications of the described embodiment are of course possible within the scope of the invention. Thus the mirror-image arrangements can be reversed. Furthermore, the angles between the branches 21 and 22 or 23 and 24 can be other than right-angles. The same applies to the conduit sections leading from the sensors 18 to the branches 22 and 24. The sensors 18 need also not be situated on a common narrow side and they can also be recessed in the block 20. Finally, it is stressed that the block 20 certainly need not have a rectangular shape. Instead, the narrow sides can be at any desired angle to one another and also constituted by individual sections inclined to one another.

The features of the subject matter of these documents disclosed in the above description, the claims, the abstract and the drawings can be of importance both individually and also in any desired combinations with one another for the realisation of the invention in its different embodiments.

We claim:
1. Method of operating a hydraulic machine unit which is selectively connected by means of at least one conduit to a tank or a pump, said conduit being under a residual pressure when connected to the tank during idling of the machine, characterized in that the residual pressure in the conduit is set to a desired value, that an actual value of the residual pressure in the conduit is measured and is compared with the desired value of the residual pressure and that a leak is indicated when the actual value of the residual pressure sinks below the desired value thereof.

2. Hydraulic drive system for working machines with a tank, a pump connected thereto and at least one conduit leading to a machine unit for the supply and return of hydraulic fluid, the conduit starting from a control device, characterized in that arranged in the conduit (14, 15) leading to a machine unit (16) there is a holding valve (17) with an opening pressure set to correspond to at least the biasing pressure prevailing in the conduit during idling of the machine and a pressure sensor (18) between each holding valve (17) and the machine unit (16) for measuring an actual value of the pressure in the conduit, whereby the actual value of the pressure is transmitted to a device (19) for comparing the actual value with the predetermined opening pressure as a desired pressure value.

3. Drive system as claimed in claim 2, characterised in that a plurality of holding valves (17) and pressure sensors (18) are arranged in a conduit (14,15) leading to a machine unit (16) to form conduit sections connected in series.

4. Drive system as claimed in claim 2 or 3, characterised in that arranged after each branching of a conduit (14,15) there is a holding valve (17) with a pressure sensor (18) connected downstream of it.

5. Drive system as claimed in claim 2 or 3, characterised in that arranged in each conduit (14,15) leading away from the control device (10) there is a respective holding valve (17) with a pressure sensor (18) connected to it.

6. Drive system as claimed in claim 3, characterized in that a valve device is provided for monitoring at least one first and at least one second conduit (14,15), with which the hydraulic machine unit (16) is connected to the control device (10), that the valve device for each conduit includes a branch (22,24) leading to the machine unit and a branch (23,25) leading to the control device, between which one of the holding valves (17) is arranged which sets the branch (22,24) leading to the machine unit at a minimum pressure and when the measured value falls below this one of the pressure sensors (18) produces a monitoring signal and that the valve device constitutes a plate-shaped block (20) in which the branches (21-24) of each conduit (14,15) extend towards the associated check valve (17) at an angle to one another, whereby the branches (21,23) leading to the control device pass into mutually opposing narrow sides (25,26) and the branches (22,24) leading to the machine unit pass into a common third narrow side (27) of the block and whereby further the branches (21,22) of the first conduit (14) are offset from one another with respect to those (23,24) of the second conduit (15) both in the direction of the mutually opposing narrow sides (25,26) and also transverse to the plate-shaped block (20).

7. Valve device as claimed in claim 6, characterized in that the branches (21,23; 22,24) of each conduit (14,15) extend at right-angles to one another.

8. Valve device as claimed in claim 6 or 7, characterized in that the same branches (21,23; 22,24) of the two conduits (14,15) extend parallel to one another.

9. Valve device as claimed in claim 6, characterized in that the holding valves (17) are inserted into bores (29,30) in a fourth narrow side (28) opposed to the third narrow side (27).

10. Valve device as claimed in claim 9, characterized in that the bores (29,30) of the holding valves (17) constitute continuations of the branches (22,24) leading to the machine unit.

11. Valve device as claimed in claim 6, characterized in that the pressure sensors (18) are arranged on one of those narrow sides (25,26) into which at least one of the branches (21,23) leading to the control device passes.

12. Drive system as claimed in calim 2, characterised in that the opening pressure predetermined in the device (19) as a desired value corresponds to the biasing pressure prevailing during idling of the machine.

13. Drive system as claimed in claim 2, characterised in that the device (19) causes the production of an acoustic signal at a predetermined deviation of the desired/actual values.

14. Drive system as claimed in claim 2, characterised in that the device (19) produces an optical signal for failure indication at a fixed deviation of the desired/actual values.

15. Drive system as claimed in claim 2, characterised in that a valve device is provided for monitoring at least one first and at least one second conduit (14,15), with which the hydraulic machine unit (16) is connected to the control device (10), that the valve device for each conduit includes a branch (22,24) leading to the machine unit and a branch (23,25) leading to the control device, between which one of the holding valves (17) is arranged which sets the branch (22,24) leading to the machine unit at a minimum pressure and when the measured value falls below this one of the pressure sensors (18) produces a monitoring signal and that the valve device constitutes a plate-shaped block (20) in which the branches (21-24) of each conduit (14,15) extend towards the associated check valve (17) at an angle to one another, whereby the branches (21,23) leading to the control device pass into mutually opposing narrow sides (25,26) and the branches (22,24) leading to the machine unit pass into a common third narrow side (27) of the block and whereby further the branches (21,22) of the first conduit (14) are offset from one another with respect to those (23,24) of the second conduit (15) both in the direction of the mutually opposing narrow sides (25,26) and also transverse to the plate-shaped block (20).

16. Valve device as claimed in claim 15, characterised in that the branches (21,23; 22,24) of each conduit (14,15) extend at right-angles to one another.

17. Valve device as claimed in claim 15 or 16, characterised in that the same branches (21,23; 22,24) of the two conduits (14,15) extend parallel to one another.

18. Valve device as claimed in claim 15, characterised in that the holding valves (17) are inserted into bores (29,30) in a fourth narrow side (28) opposed to the third narrow side (27).

19. Valve device as claimed in claim 18, characterised in that the bores (29,30) of the holding valves (17) constitute continuations of the branches (22,24) leading to the machine unit.

20. Valve device as claimed in claim 15, characterised in that the pressure sensors (18) are arranged on one of those narrow sides (25,26) into which at least one of the branches (21,23) leading to the control device passes.

* * * * *